DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 454

T905,009

AROMATIC POLYMERS

Terence Edwin Attwood, Kimpton, John Brewster Rose, Letchworth, and Alan Francis Lennox, Welwyn Garden City, England, assignors to Imperial Chemical Industries Limited, London, England

Filed Feb. 1, 1972, Ser. No. 222,697

Claims priority, application Great Britain, Feb. 4, 1971, 3,938/71

Int. Cl. C08g *23/00, 23/16*

U.S. Cl. 260—49

No Drawing. 6 Pages Specification

Aromatic polymers of repeating units of —O—E— and —O—E′— are disclosed, each —O—E— unit flanked by —O—E′— units, the —O—E— units derived from naphthalene-1,5-diol and E′ derived from a benzenoid compound of the formula:

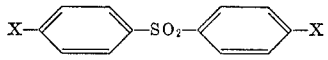

X being a halogen atom.

The polymers disclosed are useful as thermoplastic materials for mouldings, fibres, films, surface coatings and adhesives. Particular aromatic polymers disclosed are composed of repeating units having the

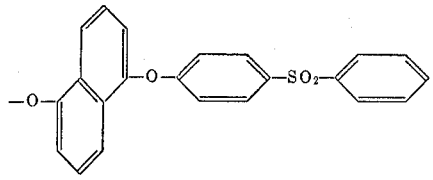

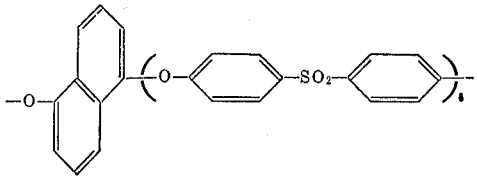

and